(12) United States Patent
Saito et al.

(10) Patent No.: US 12,177,581 B2
(45) Date of Patent: Dec. 24, 2024

(54) IMAGE PROCESSING DEVICE, IMAGE PROCESSING METHOD, IMAGE PROCESSING PROGRAM, AND IMAGING DEVICE

(71) Applicant: FUJIFILM Corporation, Tokyo (JP)

(72) Inventors: Taro Saito, Saitama (JP); Takehiro Koguchi, Saitama (JP); Yukinori Nishiyama, Saitama (JP); Tomoharu Shimada, Saitama (JP); Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 18/150,663

(22) Filed: Jan. 5, 2023

(65) Prior Publication Data

US 2023/0142489 A1 May 11, 2023

Related U.S. Application Data

(63) Continuation of application No. PCT/JP2021/027447, filed on Jul. 26, 2021.

(30) Foreign Application Priority Data

Jul. 31, 2020 (JP) ................ 2020-130636

(51) Int. Cl.
*H04N 23/88* (2023.01)
*H04N 5/77* (2006.01)
*H04N 23/60* (2023.01)

(52) U.S. Cl.
CPC .......... *H04N 23/88* (2023.01); *H04N 5/77* (2013.01); *H04N 23/64* (2023.01)

(58) Field of Classification Search
CPC ........... H04N 23/88; H04N 23/64; H04N 5/77
(Continued)

(56) References Cited

U.S. PATENT DOCUMENTS

2012/0113282 A1   5/2012   Tanaka
2013/0315556 A1*  11/2013  Ju .................... H04N 23/64
                                              386/224

FOREIGN PATENT DOCUMENTS

JP   2003-319213 A   11/2003
JP   2008-172422 A    7/2008
(Continued)

OTHER PUBLICATIONS

International Preliminary Report on Patentability and English translation of the Written Opinion of the International Searching Authority for International Application No. PCT/JP2021/027447, dated Feb. 9, 2023.
(Continued)

*Primary Examiner* — Joel W Fosselman
(74) *Attorney, Agent, or Firm* — Birch, Stewart, Kolasch & Birch, LLP

(57) ABSTRACT

Provided are an image processing device, an image processing method, an image processing program, and an imaging device capable of generating two pieces of moving image data subjected to different pieces of image processing. A processor is configured to perform processing of calculating a first image processing parameter from first moving image data obtained by imaging, processing of generating second moving image data from the first moving image data based on the first image processing parameter, processing of storing the first moving image data in the memory, and processing of generating third moving image data from the first moving image data stored in the memory based on a second image processing parameter calculated from the first moving image data with a lapse of a time (T) after the first moving image data starts to be stored in the memory.

20 Claims, 11 Drawing Sheets

(58) Field of Classification Search
USPC .................................................... 348/223.1
See application file for complete search history.

(56) References Cited

FOREIGN PATENT DOCUMENTS

| JP | 2012-120152 A |   | 6/2012 |
|----|---------------|---|--------|
| JP | 2014-3361 A   |   | 1/2014 |
| JP | 2019-80261 A  |   | 5/2019 |
| JP | 2019080261    | * | 5/2019 |

OTHER PUBLICATIONS

International Search Report for International Application No. PCT/JP2021/027447, dated Oct. 12, 2021, with English translation.
Japanese Notice of Reasons for Refusal for Japanese Application No. 2022-540268, dated Dec. 27, 2023, with an English translation.
Japanese Office Action for counterpart Japanese Application No. 2022-540268, dated Jun. 4, 2024, with English translation.

* cited by examiner

IMAGE PROCESSING DEVICE, IMAGE PROCESSING METHOD, IMAGE PROCESSING PROGRAM, AND IMAGING DEVICE

CROSS-REFERENCE TO RELATED APPLICATIONS

The present application is a Continuation of PCT International Application No. PCT/JP2021/027447 filed on Jul. 26, 2021 claiming priority under 35 U.S.C § 119(a) to Japanese Patent Application No. 2020-130636 filed on Jul. 31, 2020. Each of the above applications is hereby expressly incorporated by reference, in its entirety, into the present application.

BACKGROUND OF THE INVENTION

1. Field of the Invention

The present invention relates to an image processing device, an image processing method, an image processing program, and an imaging device, and in particular, relates to an image processing device, an image processing method, an image processing program, and an imaging device that process moving image data.

2. Description of the Related Art

A technique is described in JP2008-172422A in which in processing of white balance (WB) of a captured image, a reliability degree of a color temperature detected from a field image or the captured image is evaluated, and an update rate of a WB gain is changed according to the evaluated reliability degree.

SUMMARY OF THE INVENTION

An embodiment according to the technique of the present disclosure provides an image processing device, an image processing method, an image processing program, and an imaging device capable of generating two pieces of moving image data subjected to different pieces of image processing.

(1) An image processing device comprising a memory and a processor, in which the processor is configured to perform processing of calculating a first image processing parameter from first moving image data obtained by imaging, processing of generating second moving image data from the first moving image data based on the first image processing parameter, processing of storing the first moving image data in the memory, and processing of generating third moving image data from the first moving image data stored in the memory based on a second image processing parameter calculated from the first moving image data with a lapse of a time T after the first moving image data starts to be stored in the memory.

(2) The image processing device according to (1), in which the processor is configured to further perform processing of outputting the second moving image data to a display destination, and processing of outputting the third moving image data to a recording destination.

(3) The image processing device according to (1) or (2), in which the processor is configured to further perform processing of detecting a scene change from the first moving image data obtained by the imaging, and the processor is configured to generate a frame image captured at a timing of a start of the scene change based on the second image processing parameter calculated from the first moving image data captured before the scene change, in generating the third moving image data.

(4) The image processing device according to any one of (1) to (3), in which the processor is configured to further perform processing of detecting a scene change from the first moving image data obtained by the imaging, and the processor is configured to generate a frame image captured at a timing of an end of the scene change based on the second image processing parameter calculated from the first moving image data captured after the scene change, in generating the third moving image data.

(5) The image processing device according to (3) or (4), in which the processor is configured to continuously or stepwise change a value of the second image processing parameter used for generating a frame image captured during the scene change, in generating the third moving image data.

(6) The image processing device according to (5), in which the processor is configured to start the change in the value of the second image processing parameter from a time before the scene change starts, in generating the third moving image data.

(7) The image processing device according to (5) or (6), in which the processor is configured to end the change in the value of the second image processing parameter after the scene change ends, in generating the third moving image data.

(8) The image processing device according to (3) or (4), in which the processor is configured to, in a case where a time for the scene change exceeds the time T, fix a value of the second image processing parameter used for generating a frame image captured between the start of the scene change and the time T before an end of the scene change to the second image processing parameter calculated from the first moving image data captured at the timing of the start of the scene change, in generating the third moving image data.

(9) The image processing device according to (8), in which the processor is configured to continuously or stepwise change the value of the second image processing parameter used for generating a frame image captured between the time T before the end of the scene change and the end of the scene change, in generating the third moving image data.

(10) The image processing device according to (3) or (4), in which the processor is configured to, in a case where a time for the scene change exceeds a time T, fix a value of the second image processing parameter used for generating a frame image captured between the start of the scene change and an end of the scene change to the second image processing parameter calculated from the first moving image data captured at the timing of the start of the scene change, in generating the third moving image data.

(11) The image processing device according to (10), in which the processor is configured to further perform image processing of smoothly changing a tone of the generated third moving image data before and after the scene change.

(12) The image processing device according to (3) or (4), in which the processor is configured to, in a case where the third moving image data is generated at a variable frame rate, uniformly change a value of the second image processing parameter used for generating a frame image captured during the scene change, between frames.

(13) The image processing device according to any one of (1) to (12) further comprising a terminal that connects an external apparatus, in which the processor is configured to further perform processing of detecting connection of an external recorder to the terminal, and processing of outputting the third moving image data to the external recorder in a case where the connection of the external recorder to the terminal is detected.

(14) The image processing device according to any one of (1) to (12) further comprising a terminal that connects an external apparatus, in which the processor is configured to further perform processing of detecting connection of an external display to the terminal, and processing of outputting the second moving image data to the external display in a case where the connection of the external display to the terminal is detected.

(15) The image processing device according to any one of (1) to (14), in which the processor is configured to further perform processing of notifying that a timing at which the second moving image data is generated is different from a timing at which the third moving image data is generated.

(16) The image processing device according to any one of (1) to (15), in which the first image processing parameter and the second image processing parameter are image processing parameters necessary for white balance processing.

(17) An image processing device comprising a memory and a processor, in which the processor is configured to perform processing of receiving an instruction to switch an image processing parameter applied to first moving image data obtained by imaging, processing of detecting a scene change from the first moving image data, processing of generating second moving image data from the first moving image data based on the image processing parameter, processing of storing the first moving image data in the memory, and processing of generating third moving image data from the first moving image data stored in the memory based on the image processing parameter. In a case where the image processing parameter is switched after the scene change, the processor is configured to generate a frame image captured at a timing of a start of the scene change based on the image processing parameter before the scene change and to generate a frame image captured at a timing of an end of the scene change based on the image processing parameter switched after the scene change, in generating the third moving image data.

(18) An imaging device comprising an imaging element and the image processing device according to any one of (1) to (17) that processes moving image data output from the imaging element by imaging.

(19) An image processing method comprising processing of calculating a first image processing parameter from first moving image data obtained by imaging, processing of generating second moving image data from the first moving image data based on the first image processing parameter, processing of storing the first moving image data in a memory, and processing of generating third moving image data from the first moving image data stored in the memory based on a second image processing parameter calculated from the first moving image data with a lapse of a time T after the first moving image data starts to be stored in the memory.

(20) An image processing program causing a computer to execute processing of calculating a first image processing parameter from first moving image data obtained by imaging, processing of generating second moving image data from the first moving image data based on the first image processing parameter, processing of storing the first moving image data in a memory, and processing of generating third moving image data from the first moving image data stored in the memory based on a second image processing parameter calculated from the first moving image data with a lapse of a time T after the first moving image data starts to be stored in the memory.

DESCRIPTION OF THE PREFERRED EMBODIMENTS

Hereinafter, preferred embodiments of the present invention will be described with reference to accompanying drawings.

First Embodiment

Auto white balance (AWB) is known as one of image processing techniques in an imaging device. The AWB is processing of estimating a light source color from an image obtained by imaging and correcting the light source color to be close to an achromatic color (gray). Therefore, in a case where exposure of the captured image deviates significantly from an appropriate value, there is a problem that the light source color cannot be estimated accurately and thus the correction cannot be performed appropriately. For example, in a scene (scene change) in which brightness or the like changes significantly such as a scene going from indoors to outdoors, it may take, for example, about 1 second until appropriate exposure is achieved by automatic exposure (AE). The exposure becomes incorrect during the time for the appropriate exposure. The AWB performs processing such as determination of the light source color from the image whose exposure is appropriate. Thus, it may take a few more seconds until an appropriate tone (tint, hue) is obtained.

In the present embodiment, an imaging device capable of realizing the AWB that is not affected by the scene change for moving image data to be recorded will be described.

[Hardware Configuration of Imaging Device]

Figure 1:
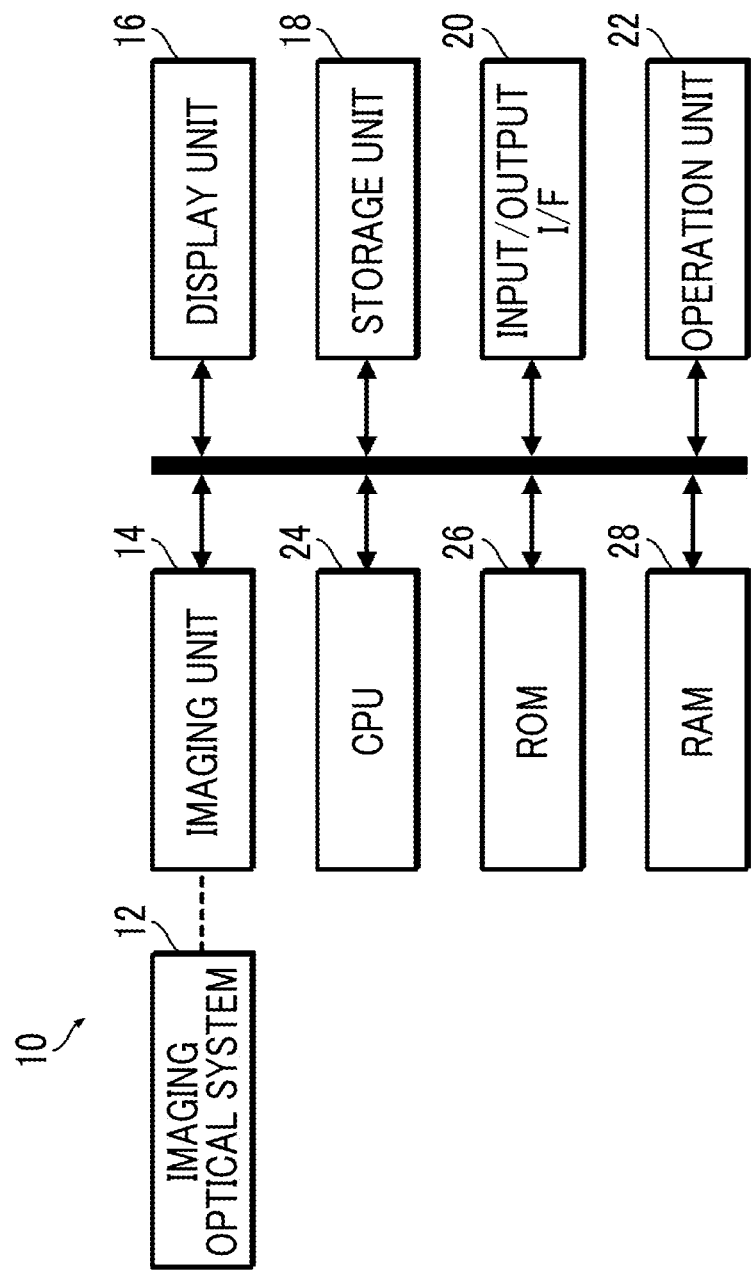
FIG. 1 is a block diagram showing an example of a hardware configuration of an imaging device.

FIG. 1 is a block diagram showing an example of a hardware configuration of the imaging device.

An imaging device 10 according to the present embodiment is an imaging device capable of capturing a moving image and comprises an imaging optical system 12, an imaging unit 14, a display unit 16, a storage unit 18, an input/output interface (I/F) 20, an operation unit 22, a central processing unit (CPU) 24, a read only memory (ROM) 26, a random access memory (RAM) 28, and the like.

The imaging optical system 12 comprises a plurality of lens groups for forming a subject image on an imaging element, a stop that adjusts a light amount, and the like. As a unit that adjusts the light amount, a neutral density (ND) filter may be provided additionally or in place of the stop.

The imaging unit 14 comprises the imaging element that converts an optical image into an electric signal. As the imaging element, for example, a color complementary metal oxide semiconductor (CMOS) image sensor having a predetermined color filter arrangement (for example, Bayer arrangement) can be used. In the imaging device 10 according to the present embodiment, the imaging element provided in the imaging unit 14 includes a driving unit, an analog to digital converter (ADC), a signal processing unit, and the like. In this case, the imaging element is driven by a built-in driving unit to operate. Further, a signal of each pixel is converted into a digital signal by a built-in ADC. Furthermore, the signal of each pixel is subjected to signal processing such as sampling two correlation pile processing, gain processing, and correction processing by a built-in signal processing unit. The signal processing may be performed on an analog signal of each pixel. Further, the signal processing may be performed on the digital signal of each pixel. As the imaging element, a known image sensor such as a charged coupled device (CCD) image sensor can be used, in addition to the above CMOS image sensor. The imaging is performed at a frame rate set in advance. The frame rate may be constant or may be randomly set by a user.

The display unit 16 comprises a display such as a liquid crystal display (LCD) or an organic light emitting diode (OLED). The display unit 16 displays a live view at the time of imaging. Further, the display unit 16 is also used as a user interface in a case where various settings are performed. The display unit 16 also includes a form of an electronic view finder (EVF) type.

The storage unit 18 stores captured moving image data (moving image data for recording). The storage unit 18 is configured of, for example, a non-volatile semiconductor memory such as an electrically erasable programmable read-only memory (EEPROM) including a flash memory, or a solid state drive (SSD). The storage unit 18 may have a configuration integrally provided in a device main body (a form of so-called built-in memory) or an attached/detached configuration (a form of so-called memory card).

The input/output I/F 20 comprises a terminal that connects an external apparatus. As a communication standard, for example, high-definition multimedia interface (HDMI) or the like can be employed (HDMI is a registered trademark).

The operation unit 22 comprises various operation members for operating the imaging device 10. The operation member includes various operation buttons, a touch panel, and the like, in addition to a power button and a record button.

The CPU 24 executes a predetermined program to function as a control unit, an image processing unit, or the like of the imaging device 10. The control performed by the CPU 24 includes display control on the display unit 16, recording control on the storage unit 18, and the like, in addition to imaging control such as AE and auto focus (AF). Further, image processing performed by the CPU 24 includes processing of generating the moving image data for recording and for display (for live view), processing of compressing the moving image data for recording, and the like. RAW data (raw moving image data output from the imaging unit 14) is subjected to predetermined image processing (so-called development processing) to generate the moving image data for recording and display. The development processing includes offset processing, gamma correction processing, demosaicing, RGB/YCrCb conversion processing, WB processing (white balance processing), and the like. Since the development processing itself is known processing, the details thereof will not be described. In the imaging device 10 according to the present embodiment, the WB processing is different between the moving image data for recording and the moving image data for display. This point will be described below. The compression processing is processing of generating a moving image file in a predetermined compression format. A well-known codec can be employed for a codec at the time of compression. For example, a codec (MPEG-1, MPEG-2, MPEG-4, or the like) standardized by moving picture experts group (MPEG), ProRes, or the like can be employed. The CPU 24 is an example of a processor. The above processing can be executed by software by a CPU, or can be partially or wholly performed by hardware provided inside the CPU.

The ROM 26 stores a program executed by the CPU 24 and various types of data necessary for control and the like. The ROM includes an EEPROM including a flash memory.

The RAM 28 is used as a work area in performing various types of processing of the CPU 24. The RAM 28 is an example of a memory.

[WB Processing]

Figure 2:
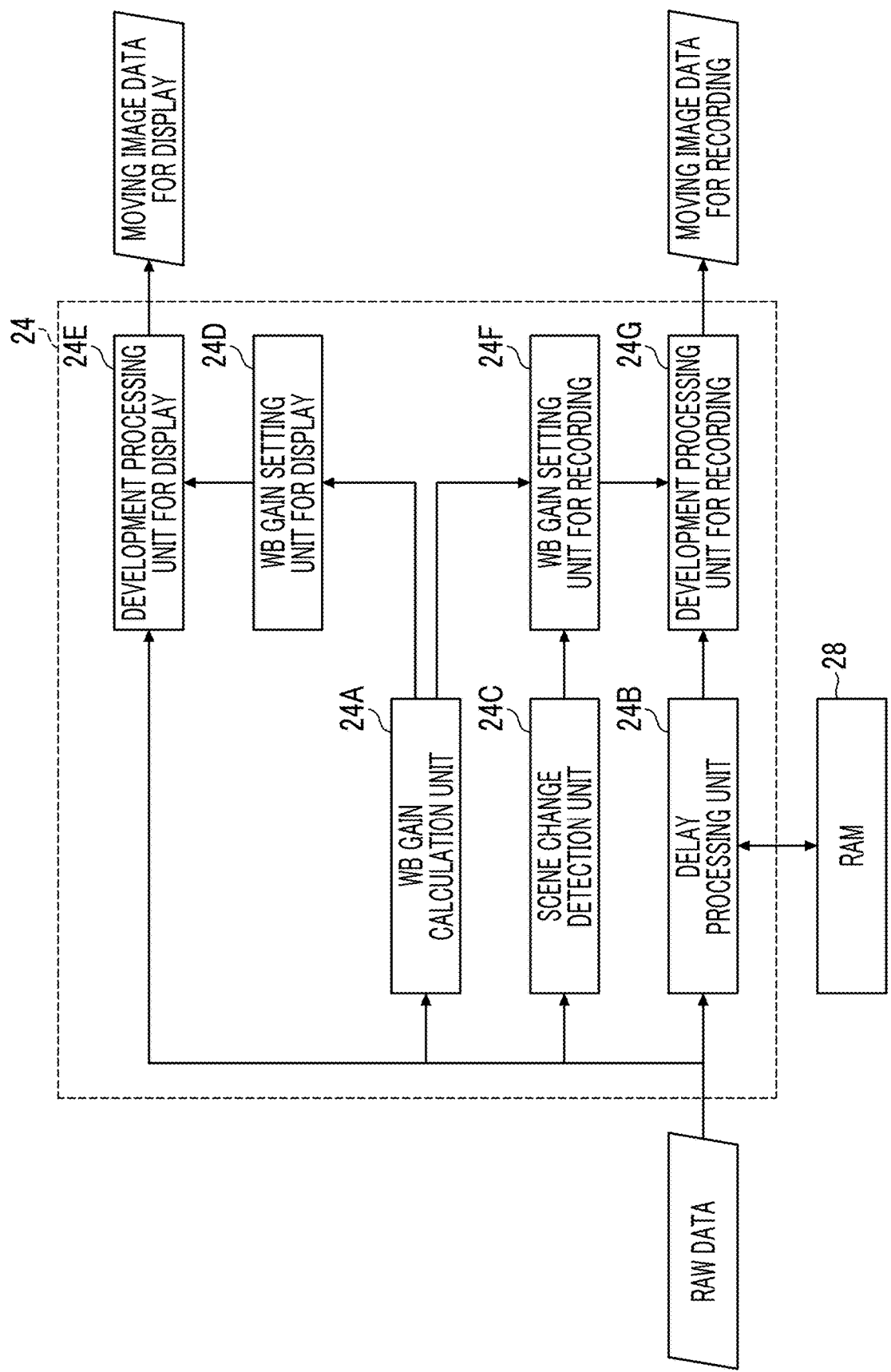
FIG. 2 is a functional block diagram of WB processing performed by an image processing unit.

FIG. 2 is a functional block diagram of the WB processing performed by the CPU.

Regarding the WB processing, the CPU 24 functions as a WB gain calculation unit 24A, a delay processing unit 24B, a scene change detection unit 24C, a WB gain setting unit for display 24D, a development processing unit for display 24E, a WB gain setting unit for recording 24F, and a development processing unit for recording 24G. Each function is realized by the CPU 24 executing a predetermined program (image processing program). The WB processing is an example of the image processing.

The WB gain calculation unit 24A calculates a WB gain from the moving image data (RAW data) output from the imaging unit 14. In a case where a color filter arrangement of the imaging elements is, for example, the Bayer arrangement, the moving image data output from the imaging unit 14 is mosaic image data of red (R), green (G), and blue (B). The WB gain calculation unit 24A calculates the WB gain from the mosaic image data for each frame. The moving image data (RAW data) output from the imaging unit 14 is an example of first moving image data.

A known method can be employed for the calculation of the WB gain. As an example, the WB gain is calculated by the following method. First, an integrated average value for each of color signals of R, G, and B is calculated for each of a plurality of divided regions set in advance. The divided region is set by equally dividing one screen, for example, 8×8 or 16×16. Next, color information is calculated for each divided region based on a calculation result of the integrated average value of each color signal. The color information is calculated as a ratio (R/G) of the calculated integrated average value of the R color signal to the calculated integrated average value of the G color signal and as a ratio (B/G) of the calculated integrated average value of the B color signal to the calculated integrated average value of the G color signal. Next, the light source color (color temperature) is estimated based on the calculated color information (R/G, B/G) for each divided region. Specifically, the light source color is estimated based on a distribution of R/G and B/G axis coordinates in a color space. Next, the WB gain corresponding to the estimated light source color is read out to acquire the WB gain of a corresponding frame image. Information on the WB gain corresponding to the light source color is stored in, for example, the ROM 26.

The delay processing unit 24B uses the RAM 28 as a buffer memory to temporarily store the moving image data (RAW data) sequentially output from the imaging unit 14 in the RAM 28 for causing delay. The delay processing unit 24B stores frame images for the number of frames set in advance in the RAM 28. The number of frame images to be stored is set to n. The delay processing unit 24B takes out the frame image after a time (T) for n frames has elapsed from the storage of the frame image in the RAM 28. The frame image for one frame is newly stored in the RAM 28 to the extent of being freed by the taking-out. The delay processing unit 24B repeats this series of operations to realize the delay processing. Therefore, the time T to be delayed is determined by the number of frames (n) to be stored in the RAM 28 and the frame rate.

The scene change detection unit 24C detects the scene change from the moving image data (RAW data) obtained by imaging. In the present embodiment, the change in the brightness is detected from the moving image data (RAW data) obtained by imaging to detect the scene change.

The WB gain setting unit for display 24D sets a WB gain required for the WB processing at the time of generating the moving image data for display. Hereinafter, the WB gain required for the WB processing of the moving image data for display is referred to as a WB gain for display. The WB gain setting unit for display 24D sets the WB gain for display based on the WB gain calculated by the WB gain calculation unit 24A. In the present embodiment, a WB gain obtained by performing weighted average on each frame image of the moving image data for display with one previous frame image is set as the WB gain for display. Therefore, for example, for an N-th frame image, a WB gain obtained by weighted averaging a WB gain calculated from the N-th frame image and a WB gain calculated from an N-lth frame image is set as the WB gain for display. The WB gain setting unit for display 24D sets the WB gain calculated by the WB gain calculation unit 24A (WB gain obtained by performing weighted average with one previous frame image in the present embodiment) as the WB gain for display without delay. The WB gain for display is an example of a first image processing parameter. In the present specification, the word "without delay" includes not only a case where the delay is strictly zero but also a case where the delay is very small.

The development processing unit for display 24E performs the development processing on the moving image data (RAW data) obtained by imaging to generate the moving image data for display. Regarding the WB processing, the development processing unit for display 24E uses the WB gain for display set by the WB gain setting unit for display 24D to perform the WB processing. As described above, in the moving image data for display, the WB gain calculated by the WB gain calculation unit 24A (WB gain obtained by performing weighted average with one previous frame image in the present embodiment) is sequentially applied without delay. The moving image data for display generated by the development processing unit for display 24E is an example of a second moving image data.

The moving image data for display generated by the development processing unit for display 24E is output to the display unit 16 and displayed on a display of the display unit 16. Accordingly, the live view is displayed on the display of the display unit 16. The display unit 16 is an example of a display destination of the moving image data for display.

The WB gain setting unit for recording 24F sets a WB gain required for the WB processing at the time of generating the moving image data for recording. Hereinafter, the WB gain required for the WB processing of the moving image data for recording is referred to as a WB gain for recording. The WB gain setting unit for recording 24F sets the WB gain for recording based on the WB gain calculated by the WB gain calculation unit 24A and a detection result of the scene change by the scene change detection unit 24C. Specifically, the WB gain for recording applied to each frame image of the moving image data for recording is set such that the WB gain for recording changes in conjunction with the scene change. Therefore, a method of setting the WB gain for recording differs depending on the presence or absence of the scene change.

In a case where there is no scene change, the WB gain setting unit for recording 24F sets the WB gain obtained by performing weighted average on each frame image with one previous frame image. That is, similarly to the WB gain for display applied to the moving image data for display, for an N-th frame image, a WB gain obtained by weighted averaging a WB gain calculated from the N-th frame image and a WB gain calculated from an N-lth frame image is set as the WB gain for recording.

The RAW data subjected to the development processing by the development processing unit for recording 24G is delayed for a certain time by the delay processing. Therefore, the WB gain setting unit for recording 24F delays each frame image by an amount delayed by the delay processing unit 24B and sets the WB gain for recording. Accordingly, the WB gain calculated from each frame image (WB gain calculated from the RAW data with the lapse of T time) is applied to each frame image. More specifically, the WB gain obtained by performing weighted average with the frame image one frame before is applied to each frame image.

On the other hand, in a case where there is a scene change, the WB gain setting unit for recording 24F sets the WB gain for each frame image such that the WB gain changes in conjunction with the scene change. Specifically, a WB gain calculated from the moving image data (RAW data) captured before the scene change with respect to the frame image captured at the timing of a start of the scene change (WB gain obtained by performing weighted average with the frame image one frame before in the present embodiment) is set as the WB gain for recording. Further, a WB gain calculated from the moving image data (RAW data) captured after the scene change with respect to the frame image captured at the timing of an end of the scene change (WB gain obtained by performing weighted average with the frame image one frame before in the present embodiment) is set as the WB gain for recording. Further, during the scene change, the WB gain for recording to be applied is set such that the WB smoothly changes between the WB gain for recording applied to the frame image at the start of the scene change and the WB gain for recording applied to the frame image at the end of the scene change. In the present embodiment, the WB gain that changes linearly is set as the WB gain for recording.

As described above, the RAW data subjected to the development processing by the development processing unit for recording 24G is delayed by T time due to the delay processing. Therefore, the WB gain for recording set by the WB gain setting unit for recording 24F is delayed by T time and is applied to each frame image of the moving image data for recording. Therefore, the WB gain for recording corresponds to the WB gain calculated from the moving image data (RAW data) with the lapse of T time after the moving image data (RAW data) obtained by imaging starts to be stored in the RAM 28. The WB gain for recording is an example of a second image processing parameter.

Figure 3:
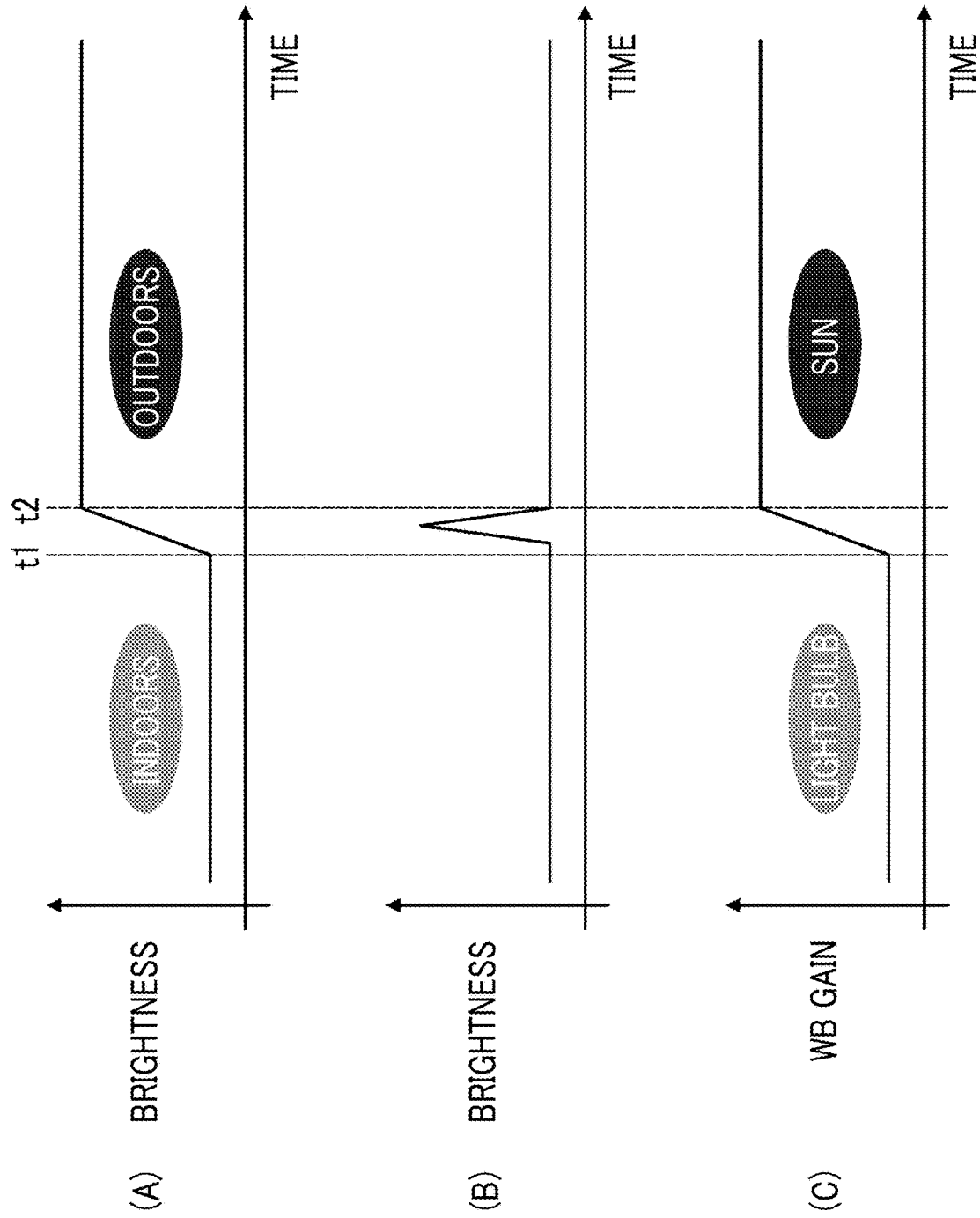
FIG. 3 is a conceptual diagram of setting a WB gain for recording.

FIG. 3 is a conceptual diagram of setting the WB gain for recording.

(A) of FIG. 3 is a diagram schematically representing the scene change from indoors to outdoors. The horizontal axis represents elapsed time, and the vertical axis represents brightness. The figure shows that the brightness fluctuates significantly in a short time in a case where movement is made from indoors under light of a light bulb to outdoors under the sunlight. In the figure, a reference numeral t1 indicates a start point in time of the scene change. Further, a reference numeral t2 indicates an end point in time of the scene change.

(B) of FIG. 3 is a diagram schematically showing a change in brightness of the live view in a case where the scene change in (A) of FIG. 3 occurs. The horizontal axis represents elapsed time, and the vertical axis represents brightness. The AE of the imaging device adjusts a shutter speed, the stop, and sensitivity according to the brightness of the surroundings to perform the control to obtain appropriate exposure. However, there is a slight time lag between sudden changes in brightness, and during that time, the live view becomes brighter (peak portion in a graph of the figure).

(C) of FIG. 3 is a diagram schematically showing the setting of the WB gain for recording. The horizontal axis represents elapsed time, and the vertical axis represents the WB gain for recording to be set. In general, the WB gain for an image is set such that blue becomes gray as the color temperature is higher and such that red becomes gray as the color temperature is lower. As shown in the figure, in the imaging device of the present embodiment, the WB gain for recording is set in accordance with the scene change. That is, the change in the WB gain for recording starts in accordance with the start of the scene change (t1), and the WB gain in a new scene is set as the WB gain for recording in accordance with the end of the scene change (t2). During the scene change, a continuously changed WB gain is set as the WB gain for recording.

The development processing unit for recording 24G performs the development processing on the moving image data (RAW data) obtained by imaging to generate the moving image data for recording. Regarding the WB processing, the development processing unit for recording 24G uses the WB gain set by the WB gain setting unit for recording 24F to perform the WB processing. As described above, the WB gain applied to the moving image data for recording changes in conjunction with the scene change in a case where there is a scene change. Therefore, the WB of the generated moving image data is corrected in conjunction with the scene change. The moving image data for recording generated by the development processing unit for recording 24G is an example of a third moving image data.

The moving image data for recording generated by the development processing unit for recording 24G is subjected to the compression processing and then stored in the storage unit 18. The storage unit 18 is an example of a recording destination of the moving image data for recording.

[Operation of Imaging Device]
[Generation of Moving Image Data for Recording]

Figure 4:
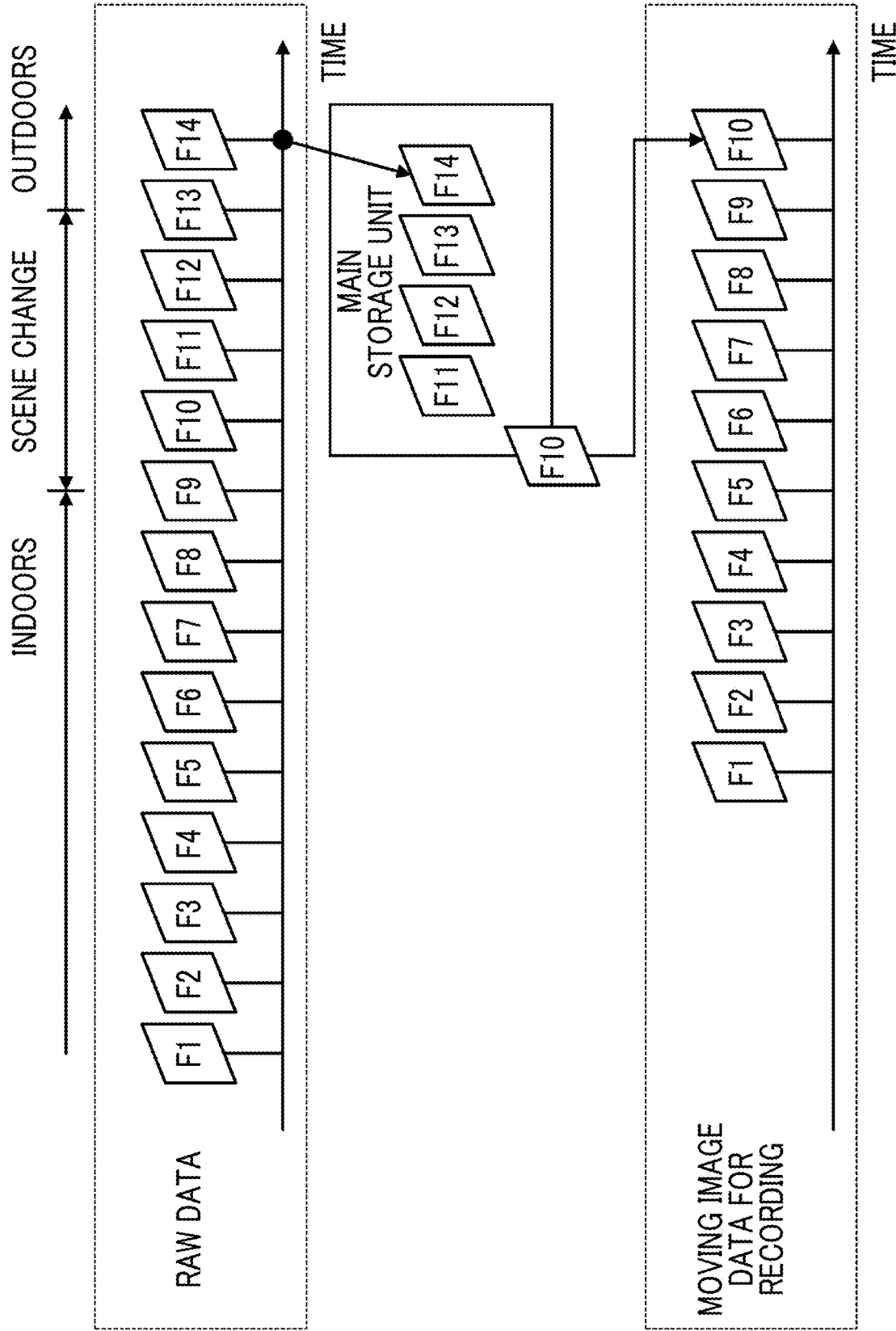
FIG. 4 is a conceptual diagram of generating moving image data for recording.

FIG. 4 is a conceptual diagram of generating the moving image data for recording.

In the figure, reference numerals F1, F2, . . . , and the like Indicate frame image numbers. The frame image numbers are assigned in chronological order.

An upper part of FIG. 4 represents the moving image data (RAW data) output from the imaging unit 14. Each frame image is output from the imaging unit 14 at a constant time interval (frame rate). The figure shows a state in which images are captured up to a fourteenth frame image. That is, the latest frame image is a fourteenth frame image F14.

Each frame image of the RAW data output from the imaging unit 14 is temporarily stored in the RAM 28. In the present example, for convenience, an example will be described in which the RAW data for four frames is stored in the RAM 28 (n=4). Each frame image of the RAW data stored in the RAM 28 is taken out from the RAM 28 after a time for the four frames has elapsed, is added to the development processing unit for recording 24G, and is subjected to the development processing.

A lower part of FIG. 4 represents the moving image data for recording generated by the development processing unit for recording 24G. Each frame image is generated with delay of a certain time (T) with respect to the output of the imaging unit 14.

The scene change is assumed to start from a ninth frame image F9 and end at a thirteenth frame image F13. The ninth frame image F9 is a frame image captured at the timing of the start of the scene change. Further, the thirteenth frame image F13 is a frame image captured at the timing of the end of the scene change. Further, a tenth frame image F10 to a twelfth frame image F12 are frame images captured during the scene change.

In this case, the WB gain before the start of the scene change is set as the WB gain for recording up to the ninth frame image F9 to perform the WB processing. Further, the WB gain after the scene change (WB gain of new scene) is set as the WB gain for recording from the thirteenth frame image F13 to perform the WB processing. Further, the WB gain linearly changed between the WB gain before the scene change and the WB gain after the scene change is set as the WB gain for recording from the tenth frame image F10 to the twelfth frame image F12 to perform the WB processing.

For example, in a case of a scene going out from indoors under the light of the light bulb to outdoors under the sunlight, a WB gain for the light bulb is applied up to the ninth frame image F9 to perform the WB processing. Further, a WB gain obtained by mixing the WB gain for the light bulb and a WB gain for sunlight is applied from the tenth frame image F10 to the twelfth frame image F12 to perform the WB processing. Further, the WB gain for sunlight is applied from the thirteenth frame image F13 to perform the WB processing.

The generated moving image data for recording is subjected to the compression processing and then stored in the storage unit 18.

As described above, in the present embodiment, in a case where there is a scene change in the moving image data for recording, the WB gain is applied in conjunction with the scene change. Accordingly, it is possible to generate high-quality moving image data for recording without being affected by the scene change.

[Generation of Moving Image Data for Display]

Figure 5:
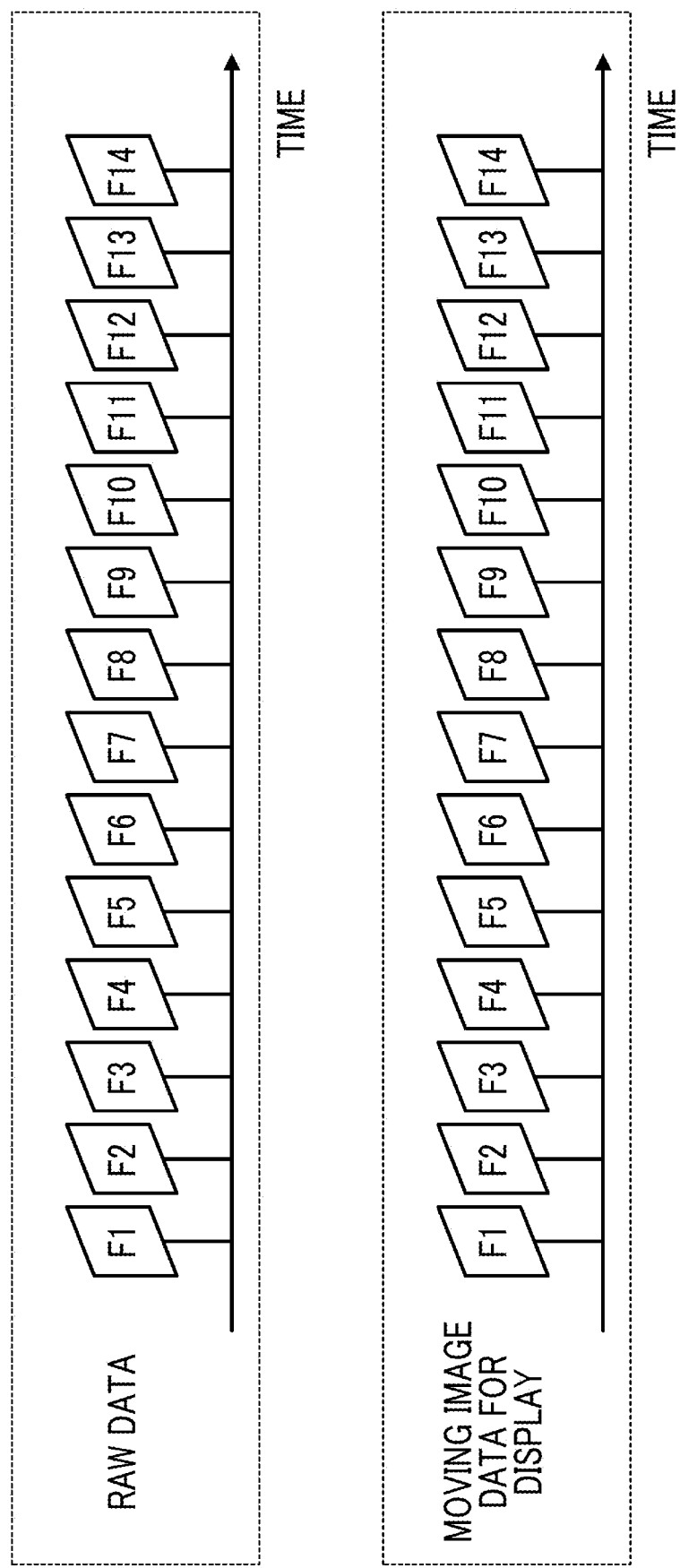
FIG. 5 is a conceptual diagram of generating moving image data for display.

FIG. 5 is a conceptual diagram of generating the moving image data for display. In the figure, reference numerals F1, F2, . . . , and the like Indicate frame image numbers. The frame image numbers are assigned in chronological order.

An upper part of FIG. 5 represents the moving image data (RAW data) output from the imaging unit 14. The figure shows a state in which images are captured up to a fourteenth frame image.

A lower part of FIG. 5 represents the moving image data for display generated by the development processing unit for display 24E. As shown in the figure, each frame image of the moving image data for display is generated without delay with respect to the output of the imaging unit 14.

Here, as the WB gain for display applied to each frame image, the WB gain calculated by the WB gain calculation unit 24A is applied without delay (WB gain obtained by performing weighted average with one previous frame image is applied in the present embodiment).

The generated moving image data for display is output to the display unit 16 and displayed on the display of the display unit 16.

In this manner, the moving image data without delay is generated for display (for live view). Accordingly, the user can check the captured image in real time and can check a focus state, an angle of view, and the like in real time.

As described above, with the imaging device 10 of the present embodiment, the user can check the captured image in real time while reflecting an appropriate WB gain for recording.

Modification Example

[Modification Example of Setting of WB Gain for Recording]

As described above, in a case where there is a scene change, the WB gain for recording applied to the moving image data for recording changes in accordance with the scene change. The WB gain for recording applied to the moving image data for recording does not necessarily have to completely match the scene change. The WB gain for recording may be changed before the start of the scene change such that the WB of the generated moving image data for recording changes more gently. Further, the change in the WB gain for recording may end after the scene change ends.

Figure 6:
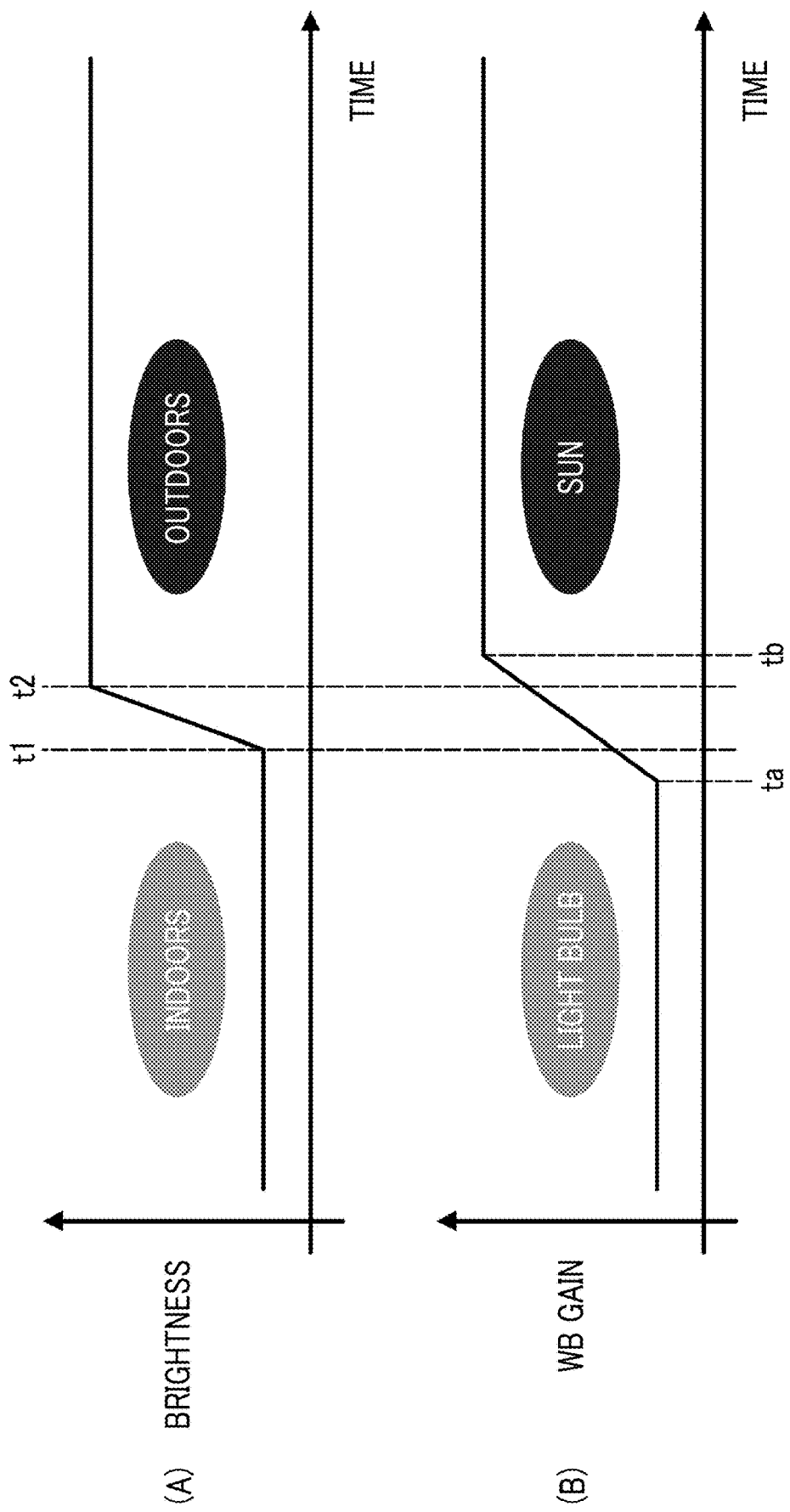
FIG. 6 is a conceptual diagram in a case where the WB gain for recording to be applied is set by starting a change before a start of a scene change and ending the change after an end of the scene change.

FIG. 6 is a conceptual diagram in a case where the WB gain for recording to be applied is set by starting the change in the WB gain for recording before the start of the scene change and ending the change after the end of the scene change.

(A) of FIG. 6 is a diagram schematically representing the scene change from indoors to outdoors. The horizontal axis represents elapsed time, and the vertical axis represents brightness. The figure shows that the brightness fluctuates significantly in a short time in a case where movement is made from indoors under light of a light bulb to outdoors under the sunlight. In the figure, a reference numeral t1 indicates a start point in time of the scene change. Further, a reference numeral t2 indicates an end point in time of the scene change.

(B) of FIG. 6 is a diagram schematically showing the setting of the WB gain for recording. The horizontal axis indicates elapsed time, and the vertical axis indicates the WB gain for recording to be set (for example, R WB gain for recording). A reference numeral ta indicates a start point in time of the change in the WB gain for recording. Further, a reference numeral tb indicates an end point in time of the change in the WB gain for recording. As shown in the figure, the change in the WB gain for recording starts before the start of the scene change (t1), and the change in the WB gain for recording ends after the end of the scene change (t2). Accordingly, the WB of the generated moving image data for recording can be changed more gently. An amount of shifting the start point in time and end point in time of the change in the WB gain for recording can be set in advance. Further, the amount thereof may be changed according to a length of the scene change.

In the above example, both the start point in time and end point in time of the change in the WB gain for recording are changed, but only one of the points in time thereof may be changed. For example, only the end point in time of the change in the WB gain for recording may be delayed from the end point in time of the scene change.

Further, in the above example, the start point in time of the change in the WB gain for recording is set before the start point in time of the scene change, and the end point in time of the change in the WB gain for recording is set after the end point in time of the scene change. However, the start point in time of the change in the WB gain for recording may be later than the start point in time of the scene change. Further, the end point in time of the change in the WB gain for recording may be set to be before the end point in time of the scene change.

[Modification Example of Setting of WB Gain for Recording During Scene Change]

In the above embodiment, the WB gain is linearly changed and applied to the frame image during the scene change, but the application form of the WB gain is not limited thereto. For example, the WB gain may be changed stepwise and applied between the start and the end of the scene change. Further, the WB gain may be curvilinearly changed. An aspect that the WB gain is changed linearly or curvilinearly between the start and the end of the scene change is an example of a case where the WB gain is continuously changed. With the continuous change of the WB gain, the WB can be smoothly changed.

In addition, the WB gain of a new scene may be switched from the center of the scene change or the start of the scene change.

[Modification Example of Calculation of WB Gain for Display and WB Gain for Recording]

In the above embodiment, regarding the WB gain for display, the WB gain obtained by performing weighted average with one previous frame image is used as the WB gain for display and is applied to each frame image of the moving image data for display. However, the WB gain may be applied without being subjected to the weighted average. For example, in a case where priority is given to responsiveness or the like, the WB gain calculated by the WB gain calculation unit 24A may be applied, without being subjected to the weighted average, to each frame image of the moving image data for display as it is. However, the determination of the light source color may fail under an unstable light source such as under a flicker light source. Thus, the WB gain obtained by performing weighted average with one previous frame image is preferably used for the WB gain for display.

The same applies to the WB gain for recording applied to each frame image of the moving image data for recording in a case where there is no scene change. The WB gain can be applied without being subjected to the weighted average with one previous frame image.

Second Embodiment

In the capturing of the moving image, it is also generally performed to record moving image data captured by using an external recorder. The external recorder is compatible with a high-speed recording medium (for example, SSD or the like) and can perform the recording using a compression method (for example, ProRes or the like) that causes almost no deterioration. Therefore, in a case where the moving image data captured by using the external recorder is recorded, high-quality moving image data is required.

In an imaging device according to the present embodiment, in a case where detection is made whether there is connection of the external recorder and the connection thereof is detected, the moving image data for recording is automatically output to the external recorder. Since a basic configuration of the device is the same as that of the imaging device according to the first embodiment, only the function of automatically outputting the moving image data for recording will be described here.

Figure 7:
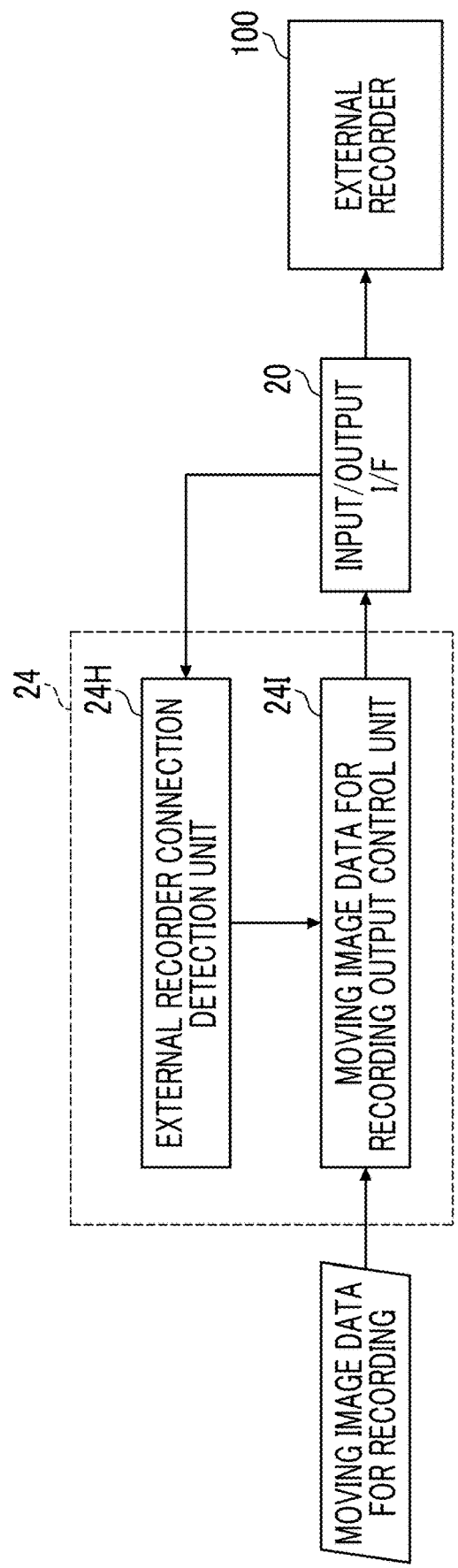
FIG. 7 is a block diagram of a function of automatically outputting the moving image data for recording.

FIG. 7 is a block diagram of the function of automatically outputting the moving image data for recording.

The CPU 24 functions as an external recorder connection detection unit 24H that detects connection of an external recorder 100 and a moving image data for recording output control unit 24I that controls the output of the moving image data for recording to the external recorder 100. These functions are realized by the CPU 24 executing a predetermined program.

The external recorder connection detection unit 24H detects the connection of the external recorder 100 to the terminal of the input/output I/F 20.

The moving image data for recording output control unit 24I controls the output of the moving image data for recording based on a detection result of the connection of the external recorder 100 by the external recorder connection detection unit 24H. In a case where the connection of the external recorder 100 is detected, the moving image data for recording output control unit 24I outputs the moving image data for recording to the external recorder 100 via the input/output I/F 20. That is, the moving image data for recording generated by the development processing unit for recording 24G is output to the external recorder 100. In this case, the recording to the storage unit 18 is stopped.

The external recorder 100 performs predetermined compression processing (for example, ProRes or the like) on the moving image data for recording output from the imaging device 10 and records the moving image data on a built-in recording medium (for example, SSD or the like). The external recorder 100 is another example of the recording destination.

With the imaging device according to the present embodiment, in a case where the external recorder 100 is connected, it is possible to automatically output the moving image data for recording to the external recorder 100. Accordingly, it is possible to automatically record high-quality moving image data using the external recorder 100.

In the above embodiment, in a case where the external recorder 100 is connected, the recording to the storage unit 18 is stopped, but the recording may be performed also on the storage unit 18.

Third Embodiment

It is important that a main subject is always in focus in capturing a moving image. For this reason, in the capturing of the moving image, a staff specialized in focus adjustment may be assigned separately from an imager (photographer). In this case, the work of connecting an external display and checking a focal state is performed. Further, the focus may be adjusted while performing magnifying display using a partial magnifying function. In this case, it is necessary to check an imaging result in real time.

In an imaging device according to the present embodiment, in a case where detection is made whether there is connection of the external display and the connection thereof is detected, the moving image data for display is automatically output to the external display. Since a basic configuration of the device is the same as that of the imaging device according to the first embodiment, only the function of automatically outputting the moving image data for display will be described here.

Figure 8:
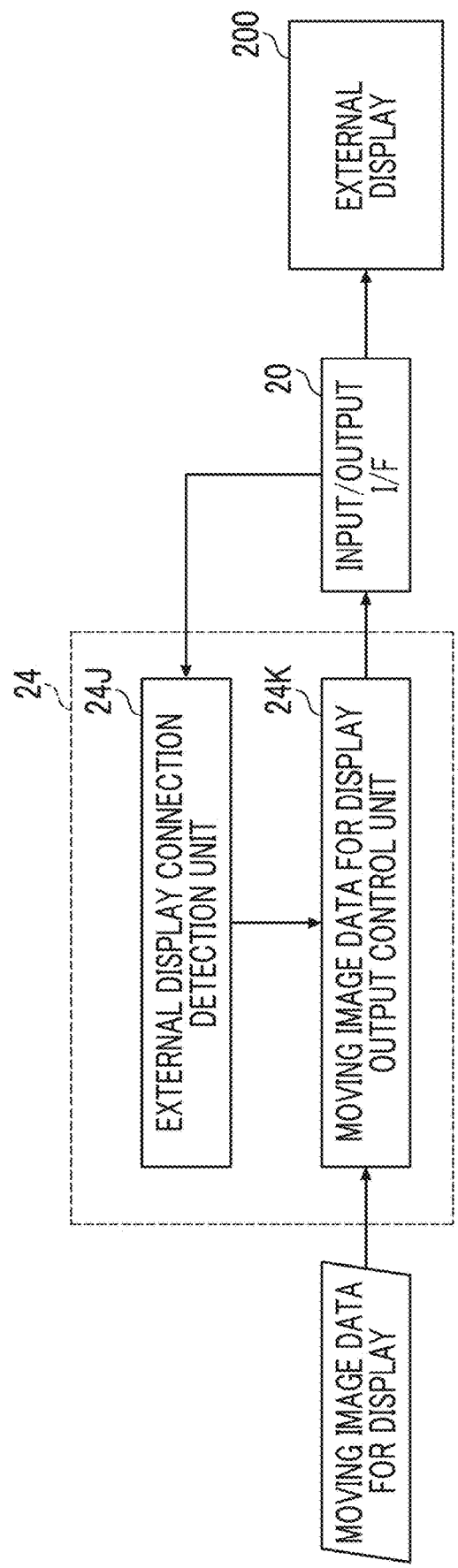
FIG. 8 is a block diagram of a function of automatically outputting the moving image data for display.

FIG. 8 is a block diagram of the function of automatically outputting the moving image data for display.

The CPU 24 functions as an external display connection detection unit 24J that detects connection of an external display 200 and a moving image data for display output control unit 24K that controls the output of the moving image data for display to the external display 200. These functions are realized by the CPU 24 executing a predetermined program.

The external display connection detection unit 24J detects the connection of the external display 200 to the terminal of the input/output I/F 20.

The moving image data for display output control unit 24K controls the output of the moving image data for display based on a detection result of the connection of the external display 200 by the external display connection detection unit 24J. In a case where the connection of the external display 200 is detected, the moving image data for display output control unit 24K outputs the moving image data for display to the external display 200 via the input/output I/F 20. That is, the moving image data for display generated by the development processing unit for display 24E is output to the external display 200. In this case, the output (display) to the display unit 16 is stopped. The external display 200 is another example of the display destination.

With the imaging device according to the present embodiment, in a case where the external display 200 is connected, the moving image data for display is automatically output to the external display 200. Accordingly, in a case where the external display 200 is connected, it is possible to check the moving image being captured in real time using the external display 200.

In the above embodiment, in a case where the external display 200 is connected, the output to the display unit 16 is stopped, but the display may be performed also on the display unit 16.

Further, in the above embodiment, the moving image data for display is output to the external display 200 with the connection of the external display 200 as a trigger. However, the moving image data for display may be output to the external display 200 according to a user's instruction. That is, the output of the moving image data for display to the external display 200 may be turned on or off according to the user's instruction. Further, the moving image data for display may be output to the external display 200 at a timing when a specific function of the imaging device is used. For example, in a case where a function of zooming the display image is provided, the moving image data for display may be output to the external display 200 in response to a zoom operation of the display image. Further, in a case where a peaking function (function of coloring outline of a focused portion) is provided, the moving image data for display may be output to the external display 200 in conjunction with the use of the peaking function. Furthermore, in a case where a manual focus function is provided, the moving image data for display may be output to the external display 200 in a case where a manual focus is set.

Fourth Embodiment

As described above, the image data for recording is generated from the RAW data delayed for a certain time. Accordingly, even in a case where there is a scene change, it is possible to change the WB in accordance with the scene change.

However, this processing can be performed in a case where the scene change is completed within the delay time. In a case where a time for the scene change is longer than the time (T) to be delayed in the RAM 28 (in a case where so-called buffer capacity is exceeded), it is impossible to smoothly change the WB in accordance with the scene change. For example, in a case where frame images for four frames can be stored in the RAM 28, an end point in time of the scene change is unknown in a case where the end of the scene change is not completed within four frames. Thus, it is impossible to smoothly change the WB in accordance with the scene change.

In the present embodiment, the setting of the WB gain for recording in a case where the time for the scene change exceeds the delay time (T) will be described.

Figure 9:
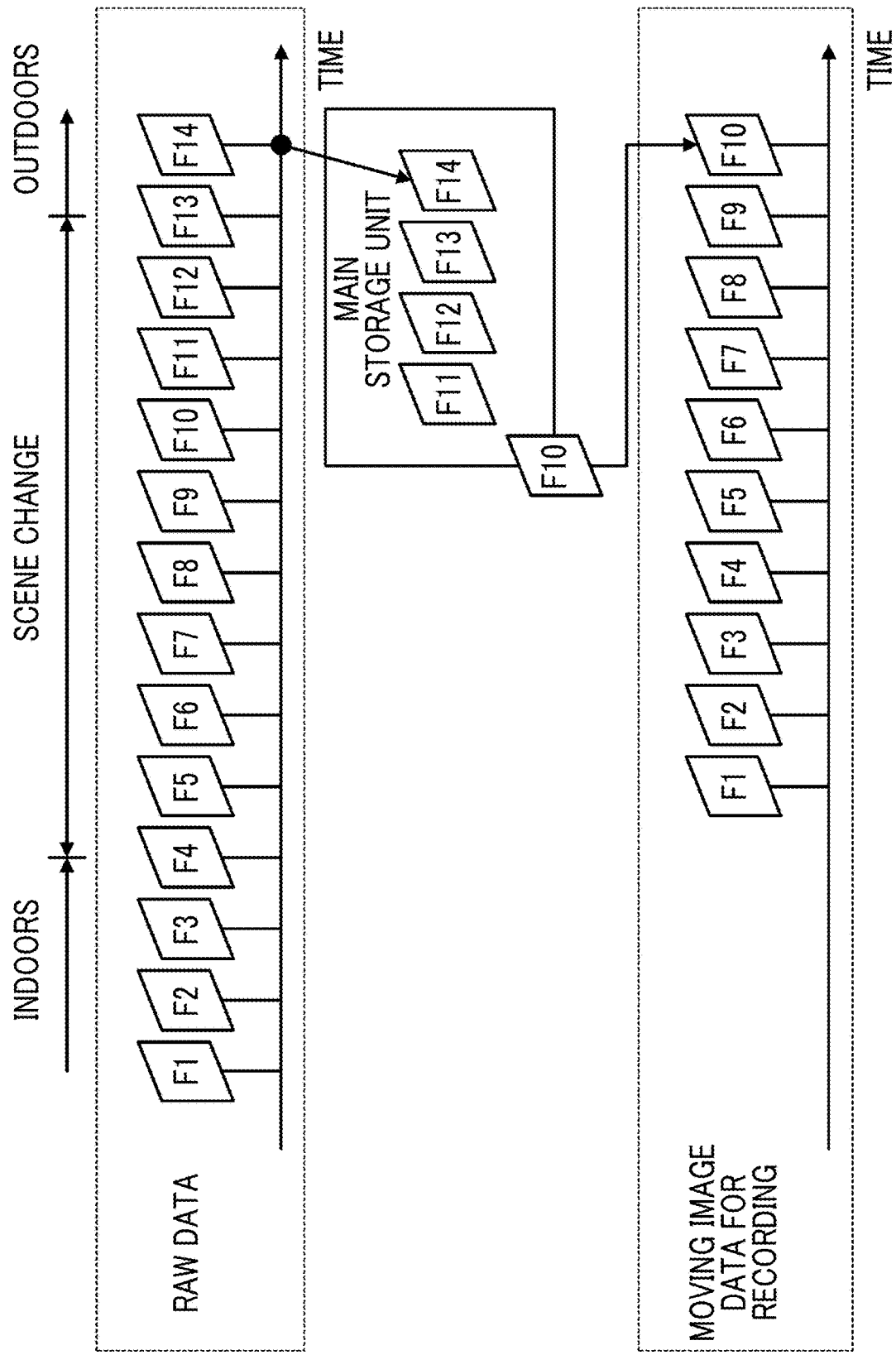
FIG. 9 is a conceptual diagram of generating the moving image data for recording.

FIG. 9 is a conceptual diagram of generating the moving image data for recording.

In the figure, reference numerals F1, F2, ..., and the like Indicate frame image numbers. The frame image numbers are assigned in chronological order.

An upper part of FIG. 9 represents the moving image data (RAW data) output from the imaging unit 14. The fourteenth frame image F14 is the latest frame image. Each frame image of the RAW data output from the imaging unit 14 is temporarily stored in the RAM 28. In the present example, for convenience, an example will be described in which the RAW data for four frames is stored in the RAM 28.

A lower part of FIG. 9 represents the moving image data for recording generated by the development processing unit for recording 24G. Each frame image is generated with delay of a certain time (T) with respect to the output of the imaging unit 14.

The scene change is assumed to start from the fourth frame image F4 and end at the thirteenth frame image F13. The fourth frame image F4 is a frame image captured at the timing of the start of the scene change. Further, the thirteenth frame image F13 is a frame image captured at the timing of the end of the scene change. Further, a fifth frame image F5 to the twelfth frame image F12 are frame images captured during the scene change.

As described above, the RAM 28 stores the RAW data for four frames. Therefore, in this case, end determination cannot be made within the delay time (T). Therefore, in the imaging device according to the present embodiment, in a case where the time for the scene change exceeds the delay time (T), the WB gain for recording is fixedly set to the WB gain calculated from the frame image at the start of the scene change. Then, in a case where the end of the scene change is detected, the WB gain for recording to be set is continuously changed between the frame image at which the development processing is started after the detection and the frame image at the end of the scene change.

The frame image at which the development processing is started is a frame image that is taken out from the RAM 28 and subjected to the development processing. This frame image is a frame image with the lapse of T time after the start of storage in the RAM 28. Therefore, the frame image at which the development processing is started at a point in time when the end of the scene change is detected is a frame image captured T time before the end of the scene change.

Further, the frame image at the end of the scene change is a frame image captured at the timing when the scene change ends.

Further, the frame image at the start of the scene change is a frame image captured at the timing when the scene change starts.

Therefore, in the case of the present embodiment, for the frame images (including frame image captured T time before the end of the scene change) from the start of the scene change to T time before the end of the scene change, the WB gain calculated from the frame image at the start point in time of the scene change is fixedly set as the WB gain for recording. For the frame image at the end of the scene change, the WB gain calculated from the frame image at the end point in time of the scene change is set as the WB gain for recording. From the frame image T time before the end of the scene change (not including the frame image T time before the end of the scene change) to the frame image at the end of the scene change, the WB gain continuously changed between the WB gain calculated from the frame image at the start point in time of the scene change and the WB gain calculated from the frame image at the end point in time of the scene change is set as the WB gain for recording.

In the example shown in FIG. 9, the frame image at the start of the scene change is the fourth frame image F4. The frame image (frame image captured T time before the end of the scene change) at which the development processing is started at the point in time when the end of the scene change is detected is the ninth frame image F9. The frame image at the end of the scene change is the thirteenth frame image F13. Therefore, in the example shown in FIG. 9, from the fifth frame image F5 to the ninth frame image F9, the WB gain calculated from the fourth frame image F4 is set as the WB gain for recording. For the thirteenth frame image F13 which is the frame image at the end of the scene change, the WB gain calculated from the thirteenth frame image F13 is set as the WB gain for recording. Form the tenth frame image F10 to the twelfth frame image F12, the WB gain continuously changed between the WB gain for recording set for the ninth frame image F9 and the WB gain for recording set for the thirteenth frame image F13 is set as the WB gain for recording.

With the imaging device according to the present embodiment, even in a case where the time for the scene change exceeds the delay time (T) (in a case where the buffer capacity is exceeded), a WB gain of a new scene is applicable in accordance with the end of the scene change. Accordingly, it is possible to generate high-quality moving image data for recording.

Further, it is possible to smoothly change the WB in accordance with the scene change.

Modification Example

The change in the WB gain for recording may end after the scene change ends such that the WB of the generated moving image data for recording changes smoothly. Further, the change in the WB gain for recording may end before the scene change ends. Further, it is not always necessary to start the change in the WB gain for recording from the frame image at which the development processing is started at the point in time when the end of the scene change is detected. The change in the WB gain for recording may be started from a frame image after the frame image thereat.

Further, in a case where the WB gain for recording is changed, the WB gain is changed linearly in the above embodiment, but may be changed stepwise. Moreover, the WB gain may be changed curvilinearly.

Fifth Embodiment

In the capturing of the moving image, the user may manually switch the WB setting according to the scene without using the AWB (manual white balance, MWB).

In a case where the WB setting is manually switched, the user may forget to switch or may not be able to switch the WB setting at an appropriate timing due to another operation (for example, stop operation, zoom operation, or the like).

In the imaging device according to the present embodiment, in a case where the user switches the WB setting after the scene change, the WB after the switching is applied in accordance with the timing of the end of the scene change by going back to the past.

Hereinafter, the generation of the moving image data for recording in a case where the WB setting is manually switched will be described.

Figure 10:
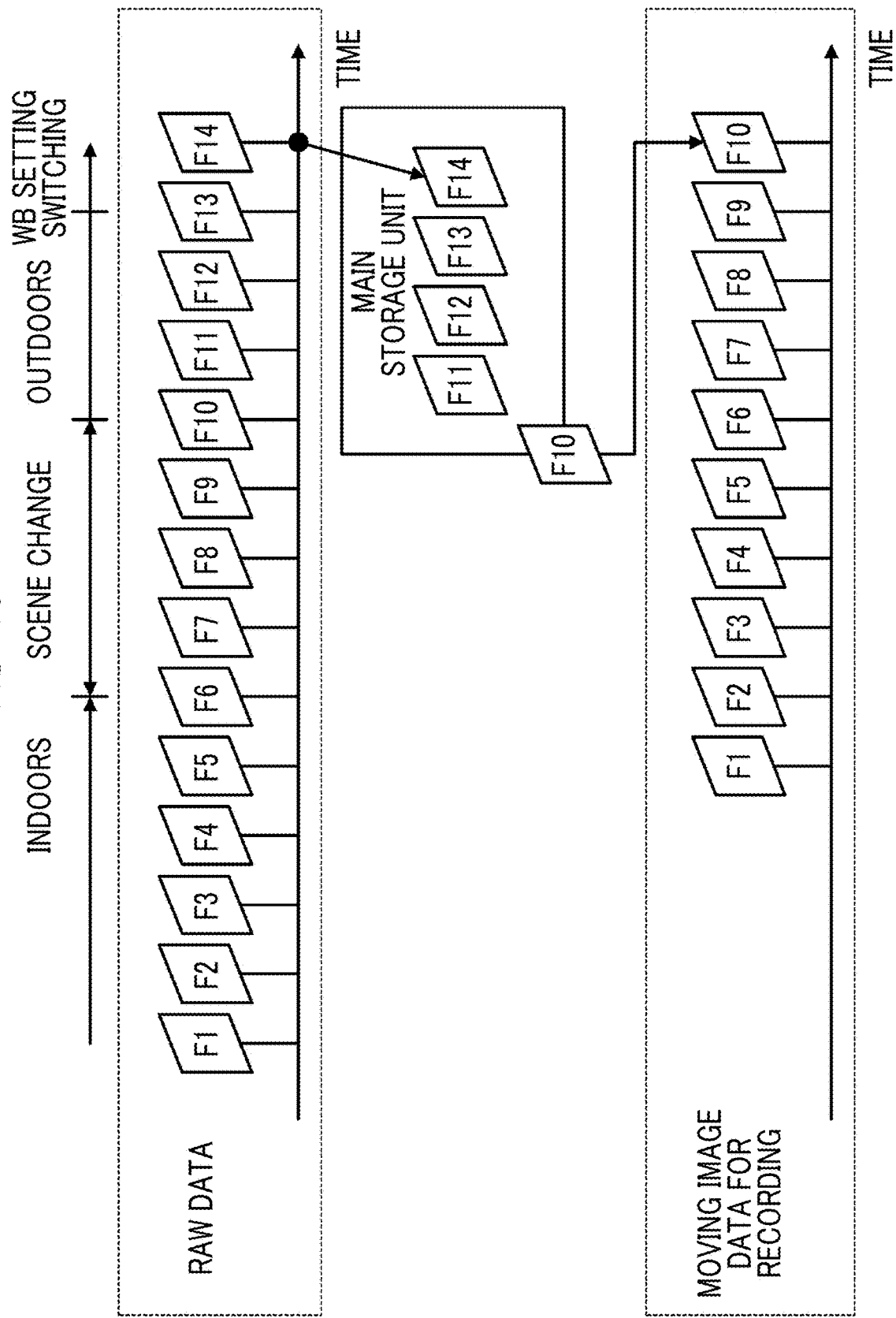
FIG. 10 is a conceptual diagram of generating the moving image data for recording.

FIG. 10 is a conceptual diagram of generating the moving image data for recording.

In the figure, reference numerals F1, F2, . . . , and the like Indicate frame image numbers. The frame image numbers are assigned in chronological order.

An upper part of FIG. 10 represents the moving image data (RAW data) output from the imaging unit 14. The fourteenth frame image F14 is the latest frame image. Each frame image of the RAW data output from the imaging unit 14 is temporarily stored in the RAM 28. In the present example, for convenience, an example will be described in which the RAW data for four frames is stored in the RAM 28. Each frame image of the RAW data stored in the RAM 28 is taken out from the RAM 28 after the time for the four frames has elapsed, is added to the development processing unit for recording 24G, and is subjected to the development processing.

A lower part of FIG. 10 represents the moving image data for recording generated by the development processing unit for recording 24G. Each frame image is generated with delay of a certain time (T) with respect to the output of the imaging unit 14.

The scene change is assumed to start from a sixth frame image F6 and end at the tenth frame image F10. The sixth frame image F6 is a frame image captured at the timing of the start of the scene change. Further, the tenth frame image F10 is a frame image captured at the timing of the end of the scene change. Further, a seventh frame image F7 to the ninth frame image F9 are frame images captured during the scene change.

It is assumed that there is an instruction to switch the WB setting at the timing of capturing the thirteenth frame image F13 by the user. The switching of the WB setting is assumed to be performed via the operation unit 22 (for example, switching by a switching switch). The CPU 24 receives the switching of the WB setting via the operation unit 22.

In this case, the WB gain based on the WB after the switching from the tenth frame image F10, which is the frame image captured at the timing of the end of the scene change, is set as the WB gain for recording to perform the WB processing (the WB gain based on the WB before the switching is set as the WB gain for recording up to the ninth frame image F9 to perform the WB processing).

As described above, with the imaging device according to the present embodiment, even in a case where the WB setting is switched after the scene change due to a user forgetting to switch the setting or the like, an appropriate WB is applicable in accordance with the timing of the end of the scene change.

In the imaging device according to the present embodiment, as the moving image data for display, the moving image data in which the WB is switched is generated in conjunction with the switching of the WB setting. In the example shown in FIG. 10, the moving image data in which the WB setting is switched from the thirteenth frame image F13 is generated. The moving image data for display is displayed on the display of the display unit 16 without delay.

Modification Example

In the above embodiment, the WB gain based on the WB after the switching is applied in accordance with the end of the scene change. However, the WB may be smoothly changed in accordance with the end of the scene change. Further, a configuration may be adopted in which the switching is performed before and after the end of the scene change. Further, the user may be able to select these switching methods.

Sixth Embodiment

As described above, in the imaging device according to the first embodiment, in a case where the time for the scene change is longer than the delay time (T), the WB cannot be smoothly changed in accordance with the scene change.

In the imaging device of the present embodiment, in a case where the time for the scene change exceeds the delay time (T), the moving image data for recording is generated as follows.

In a case where there is a scene change, the WB gain before the scene change is applied until the scene change ends to generate the moving image data for recording. That is, the WB gain is fixed to the WB gain at the start of the scene change between the start of the scene change and the end thereof to generate the moving image data for recording. After the end of the scene change, the WB gain after the scene change is applied to generate the moving image data for recording. The generated moving image data for recording is recorded in the storage unit 18. Thereafter, the moving image data recorded in the storage unit 18 is subjected to the image processing such that the tone changes smoothly before and after the scene change. That is, the WB is corrected. This image processing is performed by the CPU 24. The CPU 24 acquires the moving image data to be processed from the storage unit 18 and performs the image processing. The information on the scene change (information on the start and end timing of the scene change) may be acquired by the CPU 24 by analyzing the moving image data, or the information on the scene change detected in the imaging may be recorded in association with the moving image data.

With the imaging device according to the present embodiment, even in a case where the time for the scene change is longer than the delay time (T), it is possible to acquire the moving image data in which the tone changes smoothly in accordance with the scene change.

The moving image data to be recorded in the storage unit 18 may be the moving image data after the compression processing or the moving image data before the compression processing. Regarding the moving image data after the compression processing, it is preferable to save the frame during the scene change as an I frame. This is because there is no need to predict frames before and after the I frame for the I frame and thus it is possible to reduce a calculation amount of decoding and memory consumption.

Further, the moving image data to be processed is not limited to the data stored in the storage unit 18, but may be stored in the external storage.

Seventh Embodiment

The moving image data may be recorded at a variable frame rate for the purpose of reducing an amount of data.

Figure 11:
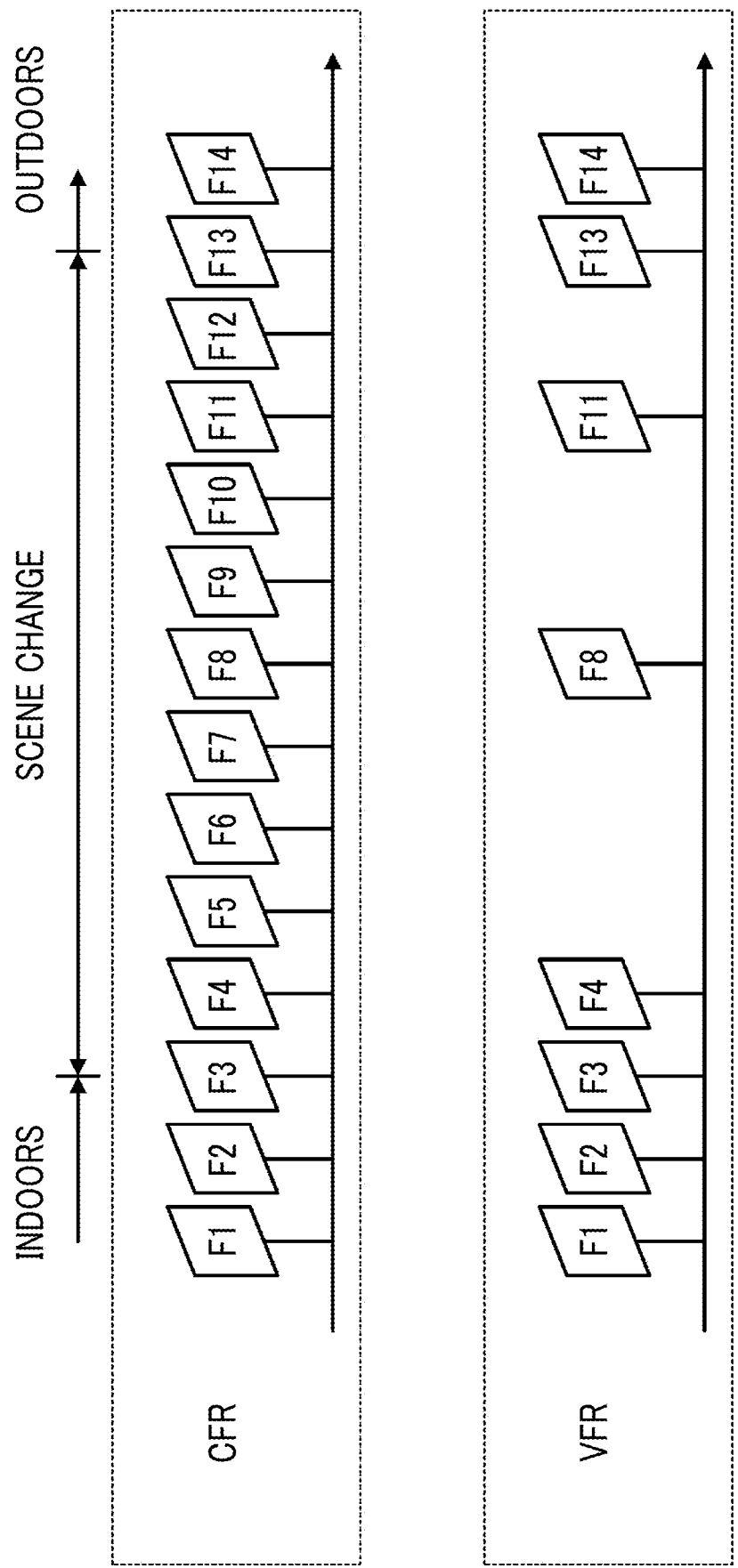
FIG. 11 is a diagram schematically representing a constant frame rate and a variable frame rate.

FIG. 11 is a diagram schematically representing a constant frame rate and a variable frame rate.

In the figure, an upper part schematically shows the moving image data captured at a constant frame rate (CFR). A lower figure schematically shows the moving image data captured at a variable frame rate (VFR).

As shown in the figure, at the constant frame rate, the imaging is performed at a fixed frame rate in all sections. On the other hand, at the variable frame rate, the frame rate changes depending on the section since similar frame images are not saved. In the example shown in the figure, the fifth frame image F5 to the seventh frame image F7, the ninth frame image F9 to the tenth frame image F10, and the twelfth frame image F12 do not exist.

The scene change is assumed to start from the third frame image F3 and end at the thirteenth frame image F13. In this case, the WB gain to be applied is changed between the third frame image F3 and the thirteenth frame image F13, and thus the WB can be appropriately changed in accordance with the switching of the scene change. That is, the WB gain to be applied is changed from the fourth frame image F4 to the twelfth frame image F12, and thus the WB can be appropriately changed in accordance with the switching of the scene change.

However, in the case of the variable frame rate, in a case where the WB gain to be applied is linearly changed in accordance with the lapse of time, the tone may change significantly during reproduction and thus unnaturalness may become conspicuous conversely. For example, in the example of FIG. 11, the tone changes significantly between the fourth frame image F4 and the eighth frame image F8.

In the imaging device of the present embodiment, in a case where the recording is performed at the variable frame rate, the WB gain to be applied is set on a frame basis. Specifically, the WB gain to be applied is set such that a change amount is uniform between the frames.

For example, in the example of FIG. 11, the WB gain applied from the fourth frame image F4 to the twelfth frame image F12 is changed. In this case, the WB gain applied to each frame image is set such that the change amount between the third frame image F3 and the fourth frame image F4, the change amount between the fourth frame image F4 and the eighth frame image F8, the change amount between the eighth frame image F8 and the eleventh frame image F11, and the change amount between the eleventh frame image F11 and the thirteenth frame image F13 are to be equal to each other.

Accordingly, in a case where the recording is performed at the variable frame rate, it is possible to prevent the moving image data to be recorded from having an unnatural tone due to the scene switching.

The setting of whether the recording is performed at the constant frame rate or the variable frame rate is assumed to be performed via the operation unit 22. The CPU 24 generates the moving image data for recording in a set mode.

Other Embodiments

[Detection of Scene Change]

In the above embodiment, the change in the brightness is detected from the moving image data obtained by imaging to detect the scene change, but the method for detecting the scene change is not limited thereto. For example, a configuration may be employed in which the operation of the user on the imaging device is detected and the scene change is detected based on the detection result. For example, the scene change can be detected by detecting a focus adjustment operation, a stop operation, an imaging sensitivity operation, or the like. Regarding the focus adjustment operation, the stop operation, and the imaging sensitivity operation, for example, in a case where there is an operation equal to or larger than a threshold value, it is detected as the scene change. In addition, it is also possible to detect the scene change by detecting on or off of the neutral density filter. Further, in a case where the imaging device is provided with a sensor such as an acceleration sensor, it is also possible to detect the scene change based on an output of the sensor. In this case, for example, in a case where the output of the sensor changes significantly, it is detected as the scene change.

[Notice of Delay Record]

As described above, in the imaging device to which the present invention is applied, two pieces of moving image data of the moving image data for display and the moving image data for recording are generated. The moving image data for recording is generated and recorded with delay with respect to the moving image data for display. Therefore, at the time of use, it is preferable to notify the user that generation timings of the moving image data for display and the moving image data for recording are different.

The timing of notification is not particularly limited. For example, the notification may be made at the timing of starting the imaging. Further, the notification may be made at the timing of detecting the scene change. The timing of detecting the scene change is also the timing at which the WB gain to be applied changes.

The notification method is also not particularly limited. For example, a message, an icon, or the like may be displayed on the display of the display unit 16 for notification, or a display element such as a light emitting diode (LED) may be separately provided to display the message, the icon, or the like.

[Image Processing]

In the above embodiment, the case where the WB processing is performed has been described as an example, but the application of the present invention is not limited thereto. The same can be applied to a case where the image processing is performed by using other image processing parameters.

[Image Processing Device]

In the above embodiment, the case where the imaging device has the function of the image processing device has been described as an example, but the image processing device may be configured as a single unit. Further, there may be a case where the imaging device is incorporated into another device such as a smartphone or a personal computer.

[Hardware Configuration]

In the present invention, a hardware structure of the processing unit that performs each piece of processing is formed by various processors. The various processors include a central processing unit (CPU) and/or a graphic processing unit (GPU) which are general-purpose processors that execute a program to function as various processing units, a programmable logic device (PLD) whose circuit configuration is changeable after manufacturing such as a field programmable gate array (FPGA), a dedicated electric circuit which is a processor having a circuit configuration exclusively designed to execute specific processing such as an application specific integrated circuit (ASIC), and the like. The program is synonymous with software.

One processing unit may be configured by one of these various processors or may be configured by two or more processors having the same type or different types. For example, one processing unit may be configured by a plurality of FPGAs or a combination of a CPU and an FPGA. The plurality of processing units may be configured of one processor. As an example of constituting the plurality of processing units by one processor, first, there is a form in which one processor is composed of a combination of one or more CPUs and software, as represented by a computer used as a client or a server, and the one processor functions as the plurality of processing units. Second, there is a form in which a processor that realizes the functions of the entire system including the plurality of processing units with one integrated circuit (IC) chip is used, as represented by a system-on-chip (SoC) or the like. As described above, the various processing units are configured by using one or more various processors as a hardware structure.

EXPLANATION OF REFERENCES

- 10: imaging device
- 12: imaging optical system
- 14: imaging unit
- 16: display unit
- 18: storage unit
- 20: input/output I/F
- 22: operation unit
- 24: CPU
- 24A: WB gain calculation unit
- 24B: delay processing unit
- 24C: scene change detection unit
- 24D: WB gain setting unit for display
- 24E: development processing unit for display
- 24F: WB gain setting unit for recording
- 24G: development processing unit for recording
- 24H: external recorder connection detection unit
- 24I: moving image data for recording output control unit
- 24J: external display connection detection unit
- 24K: moving image data for display output control unit
- 26: ROM
- 28: RAM
- 100: external recorder
- 200: an external display
- F1 to F14: frame image

What is claimed is:

1. An image processing device comprising:
a memory; and
a processor configured to perform:
processing of calculating a first image processing parameter from first moving image data obtained by imaging;
processing of generating second moving image data from the first moving image data based on the first image processing parameter;
processing of outputting the second moving image data to a display destination;
processing of storing the first moving image data in the memory;
processing of generating third moving image data from the first moving image data stored in the memory based on a second image processing parameter calculated from the first moving image data with a lapse of a time T after the first moving image data starts to be stored in the memory; and
processing of outputting the third moving image data to a recording destination.

2. The image processing device according to claim 1,
wherein the processor is configured to further perform processing of detecting a scene change from the first moving image data obtained by the imaging, and
the processor is configured to generate a frame image captured at a timing of a start of the scene change based on the second image processing parameter calculated from the first moving image data captured before the scene change, in generating the third moving image data.

3. The image processing device according to claim 1,
wherein the processor is configured to further perform processing of detecting a scene change from the first moving image data obtained by the imaging; and
the processor is configured to generate a frame image captured at a timing of an end of the scene change based on the second image processing parameter calculated from the first moving image data captured after the scene change, in generating the third moving image data.

4. The image processing device according to claim 2,
wherein the processor is configured to continuously or stepwise change a value of the second image processing parameter used for generating a frame image captured during the scene change, in generating the third moving image data.

5. The image processing device according to claim 4,
wherein the processor is configured to start the change in the value of the second image processing parameter from a time before the scene change starts, in generating the third moving image data.

6. The image processing device according to claim 4,
wherein the processor is configured to end the change in the value of the second image processing parameter after the scene change ends, in generating the third moving image data.

7. The image processing device according to claim 2,
wherein the processor is configured to, in a case where a time for the scene change exceeds the time T,
fix a value of the second image processing parameter used for generating a frame image captured between the start of the scene change and the time T before an end of the scene change to the second image processing parameter calculated from the first moving image data captured at the timing of the start of the scene change, in generating the third moving image data.

8. The image processing device according to claim 7,
wherein the processor is configured to:
continuously or stepwise change the value of the second image processing parameter used for generating a frame image captured between the time T before the end of the scene change and the end of the scene change, in generating the third moving image data.

9. The image processing device according to claim 2,
wherein the processor is configured to, in a case where a time for the scene change exceeds the time T, fix a value of the second image processing parameter used for generating a frame image captured between the start of the scene change and an end of the scene change to the second image processing parameter calculated from the first moving image data captured at the timing of the start of the scene change, in generating the third moving image data.

10. The image processing device according to claim 9,
wherein the processor is configured to further perform image processing of smoothly changing a tone of the generated third moving image data before and after the scene change.

11. The image processing device according to claim 2,
wherein the processor is configured to, in a case where the third moving image data is generated at a variable frame rate,
uniformly change a value of the second image processing parameter used for generating a frame image captured during the scene change, between frames.

12. The image processing device according to claim 1, further comprising:
a terminal that connects an external apparatus,
wherein the processor is configured to further perform:
processing of detecting connection of an external recorder to the terminal; and
processing of outputting the third moving image data to the external recorder in a case where the connection of the external recorder to the terminal is detected.

13. The image processing device according to claim 1, further comprising:
a terminal that connects an external apparatus,
wherein the processor is configured to further perform:
processing of detecting connection of an external display to the terminal; and
processing of outputting the second moving image data to the external display in a case where the connection of the external display to the terminal is detected.

14. The image processing device according to claim 1,
wherein the processor is configured to further perform processing of notifying that a timing at which the second moving image data is generated is different from a timing at which the third moving image data is generated.

15. The image processing device according to claim 1,
wherein the first image processing parameter and the second image processing parameter are image processing parameters necessary for white balance processing.

16. An imaging device comprising:
an imaging element; and
the image processing device according to claim 1, that processes moving image data output from the imaging element by imaging.

17. An image processing device comprising:
a memory; and
a processor configured to perform:
processing of receiving an instruction to switch an image processing parameter applied to first moving image data obtained by imaging;
processing of detecting a scene change from the first moving image data;
processing of generating second moving image data from the first moving image data based on the image processing parameter;
processing of outputting the second moving image data to a display destination;
processing of storing the first moving image data in the memory;
processing of generating third moving image data from the first moving image data stored in the memory based on the image processing parameter; and
processing of outputting the third moving image data to a recording destination, and
in a case where the image processing parameter is switched after the scene change, the processor is configured to generate a frame image captured at a timing of a start of the scene change based on the image processing parameter before the scene change and to generate a frame image captured at a timing of an end of the scene change based on the image processing parameter switched after the scene change, in generating the third moving image data.

18. An imaging device comprising:
an imaging element; and
the image processing device according to claim 17, that processes moving image data output from the imaging element by imaging.

19. An image processing method comprising:
processing of calculating a first image processing parameter from first moving image data obtained by imaging;
processing of generating second moving image data from the first moving image data based on the first image processing parameter;
processing of outputting the second moving image data to a display destination;
processing of storing the first moving image data in a memory;
processing of generating third moving image data from the first moving image data stored in the memory based on a second image processing parameter calculated from the first moving image data with a lapse of a time T after the first moving image data starts to be stored in the memory; and
processing of outputting the third moving image data to a recording destination.

20. A non-transitory, computer-readable tangible recording medium on which a program for causing, when read by a computer, the computer to execute the image processing method according to claim 19 is recorded.

* * * * *